(12) United States Patent
Enrietti (10) Patent No.: US 8,496,464 B2
(45) Date of Patent: Jul. 30, 2013

(54) CLOSURE ASSEMBLY, WITH A MULTI-ROD DRIVE, FOR THE INJECTION MOULDING OF PLASTIC MATERIAL

(75) Inventor: Roberto Enrietti, Pont Saint Martin (IT)

(73) Assignee: Thermoplay S.p.A., Pont Saint Martin (AO) (IT)

( * ) Notice: Subject to any disclaimer, the term of this patent is extended or adjusted under 35 U.S.C. 154(b) by 0 days.

(21) Appl. No.: 13/808,563

(22) PCT Filed: Jul. 18, 2011

(86) PCT No.: PCT/IT2011/000252
§ 371 (c)(1),
(2), (4) Date: Jan. 22, 2013

(87) PCT Pub. No.: WO2012/011139
PCT Pub. Date: Jan. 26, 2012

(65) Prior Publication Data
US 2013/0129856 A1 May 23, 2013

(30) Foreign Application Priority Data
Jul. 20, 2010 (IT) .............................. BI2010A0010

(51) Int. Cl.
*B29C 45/23* (2006.01)
(52) U.S. Cl.
USPC .................. 425/190; 425/192 R; 425/564
(58) Field of Classification Search
USPC .................. 425/190, 192 R, 564, 566, 570
See application file for complete search history.

(56) References Cited

U.S. PATENT DOCUMENTS

| | | | |
|---|---|---|---|
| 6,419,870 B1 * | 7/2002 | Lee et al. | 425/564 |
| 7,131,834 B2 * | 11/2006 | Babin et al. | 425/564 |
| 7,347,684 B2 * | 3/2008 | Tabassi et al. | 425/564 |
| 7,722,351 B2 * | 5/2010 | Feick et al. | 425/564 |
| 7,766,646 B2 * | 8/2010 | Feick et al. | 425/564 |
| 2009/0148551 A1 | 6/2009 | Feick | |
| 2013/0087731 A1 * | 4/2013 | Enrietti | 251/319 |

FOREIGN PATENT DOCUMENTS
WO  2009/052615 A1  4/2009

OTHER PUBLICATIONS

PCT International Search Report, Application PCT/IT2011/000252, filed Jul. 18, 2011 in the name Thermoplay S.P.A., Date of mailing: Oct. 11, 2011.
PCT Written Opinion of the International Searching Authority, Application PCT/IT2011/000252, filed Jul. 18, 2011 in the name Thermoplay S.P.A., Date of mailing: Oct. 11, 2011.
PCT Written Opinion of the International Preliminary Examining Authority, Application PCT/IT2011/000252, filed Jul. 18, 2011 in the name Thermoplay S.P.A., Date of mailing: Jun. 28, 2012.
PCT International Preliminary Report on Patentability, Application PCT/IT2011/000252, filed Jul. 18, 2011 2011 in the name Thermoplay S.P.A., Date of mailing: Sep. 27, 2012.

* cited by examiner

*Primary Examiner* — James Mackey
(74) *Attorney, Agent, or Firm* — Steinfl & Bruno LLP (57) ABSTRACT

A closure assembly, of the type with a multi-rod drive, for the injection moulding of plastic material is described. The closure assembly has a plurality of closing rods and a driving plate, wherein the driving plate is adapted to move between an open position and a closed position. The closure assembly also has disconnecting and fixing means associated with each closing rod for disconnecting it from the driving plate, independently from the other closing rods, and to firmly fix it, once disconnected, on a side of the mould.

8 Claims, 5 Drawing Sheets

CLOSURE ASSEMBLY, WITH A MULTI-ROD DRIVE, FOR THE INJECTION MOULDING OF PLASTIC MATERIAL

CROSS REFERENCE TO RELATED APPLICATIONS

The present application is the US national stage of International Application PCT/IT2011/000252 filed on Jul. 18, 2011 which, in turn, claims priority to Italian Application BI2010A000010 filed on Jul. 20, 2010.

TECHNICAL FIELD

The present invention concerns in general the sector of the injection moulding of plastic material, and more in detail it concerns a closure assembly of the type having a multi-rod drive, that is comprising a plurality of closing rods, each associated with a respective injection nozzle, that are suitable to be contemporarily controlled and driven in a machine or system for the injection moulding of plastic material.

BACKGROUND ART

In the technique of the injection moulding of plastic material it is known to inject the plastic material in the molten state into a mould through a plurality of nozzles or injection units, generally associated with a distribution plate, also called "hot distribution plate", usually integrated in the same mould, that has the function of receiving the molten plastic material and of distributing it into the various injection nozzles, so that it is injected into the mould.

It is also known to control the injection of plastic material, in each injection unit, by contemporarily driving a plurality of closing rods or pins, each associated with a respective injection unit, so that each closing rod moves alternately, along its axis, between an open position, in which the tip of the rod sets free an injection hole of the injection unit, whereby the molten plastic material can freely flow into the cavity of the mould, and a closed position, in which the tip of the rod closes the injection hole, so as to interrupt the flow of the fluid plastic material from the injection unit toward the cavity of the mould.

Often, in the jargon of the field of injection moulding, this control system of the multi-rod type, i.e. capable of simultaneously controlling and driving a plurality of closing rods, is also called "table drive", or "table system", or with equivalent expressions, since the reciprocating motion of the closing rods is achieved through a plate, that recalls the form of a table, to which each closing rod is connected at one respective end, whereby this plate, while moving alternately between two opposite end positions, contemporarily control and drive all the closing rods to move between their open and closed positions.

In the application and in the use of these driving groups or systems of the multi-rod type, it can happen that an injection unit or nozzle breaks down or is subject in general to a drawback or failure, for instance because the resistance that holds in temperature the same injection unit blows out, or for other causes.

In these circumstances, it is often necessary to intervene in order to repair the broken injection unit, so as to ensure correct operation of the moulding system.

Insofar in the practice it is necessary to disassemble the driving plate of the closing rods, as well as other parts of the system, so as to be able to reach and to intervene in the zone of the broken injection nozzle, i.e. to get off and repair it, and if it is the case to replace it.

Then, in the actual state of the art, a breakdown as that above summarily described, or a similar drawback, involves, in fact, the interruption of the operation of moulding for a period of time that is not negligible, in order to allow to complete the intervention and to make the reparation.

This of course entails a notable loss of time, with a considerable increase in the costs and certainly a negative effect on the overall performance and the efficiency of the moulding operation.

DISCLOSURE OF INVENTION

Therefore a primary object of the present invention is to provide an improved closure assembly, of the type having a multi-rod drive capable of contemporarily driving a plurality of closing rods each associate with a respective injection unit, in a machine or system for the injection moulding of plastic material into a mould, which closure assembly is able to overcome the drawbacks as set out above, and in particular, when an injection unit of the moulding machine or system fails, or in general has a inconvenience, allows such injection unit that has failed or is defective to be easily disassembled, and also, after such disassembling, allows the continued use of the moulding machine or system in order to inject, through the other well-functioning injection units, the plastic material into the mould.

A second more general object, however related to the earlier, of the present invention is also to provide a closure assembly, with a multi-rod drive, which implies a significant and tangible saving in the management and maintenance costs of the machines and/or injection moulding systems in which it is applied to drive the closing rods of the various injection nozzles.

The aforesaid objects can be fully considered reached by the closure assembly, with a multi-rod type drive, having the characteristics recited by the first main independent claim.

Special embodiments of the closure assembly of the invention are also defined by the dependent claims.

The closure assembly of the invention exhibits numerous and important advantages, in part already anticipated, of which there are cited, by exemplary way, the following ones:
- no effective stop of the working of the injection moulding machine, in case of breakdown or failure of one injection unit;
- consequent reduction of the downtime in which the moulding machine does not work;
- possibility of choosing the most opportune and convenient time, so as to not impact on the work program of the moulding machine, for performing the repair of the failed or defective injection unit;
- separate management of each single injection unit for regulating and adjusting the respective closing rod.

BRIEF DESCRIPTION OF DRAWINGS

These and other objects, characteristics and advantages of the present invention will clearly appear from the following description of a preferred embodiment thereof, provided solely by way of a non-limiting example with reference to the accompanying drawings, where.

BEST MODE FOR CARRYING OUT THE INVENTION

With reference to the drawings, a closure or closing assembly having the characteristics of the present invention is indicated in the whole with 10.

The closure assembly 10 of the invention is typically incorporated into and is part of a more general machine or injection moulding system, indicated with MS and only partially represented in the drawings, for the injection of a plastic material MP, in a fluid or molten state, into a mould 20.

In particular, the molten plastic material is injected MP into the cavity of the mould 20 via a plurality of nozzles or injection units arranged along a fixed surface or side 20a of the same mould 20.

Figure 1:
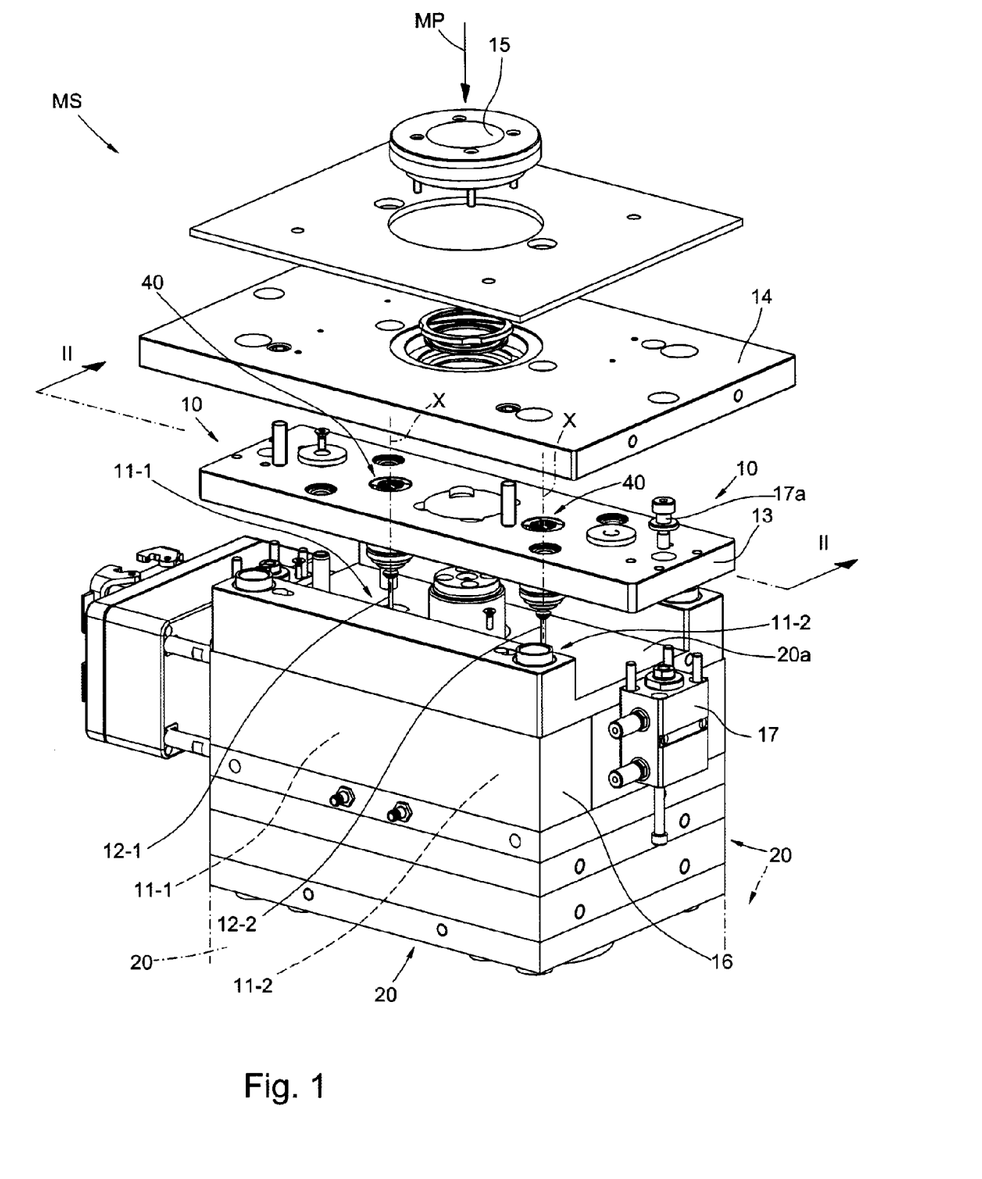
FIG. 1 is a partial perspective view, in exploded form, of a machine for the injection moulding of plastic material which incorporates a closure assembly, with a multi-rod drive, according to the present invention.
Figure 2:
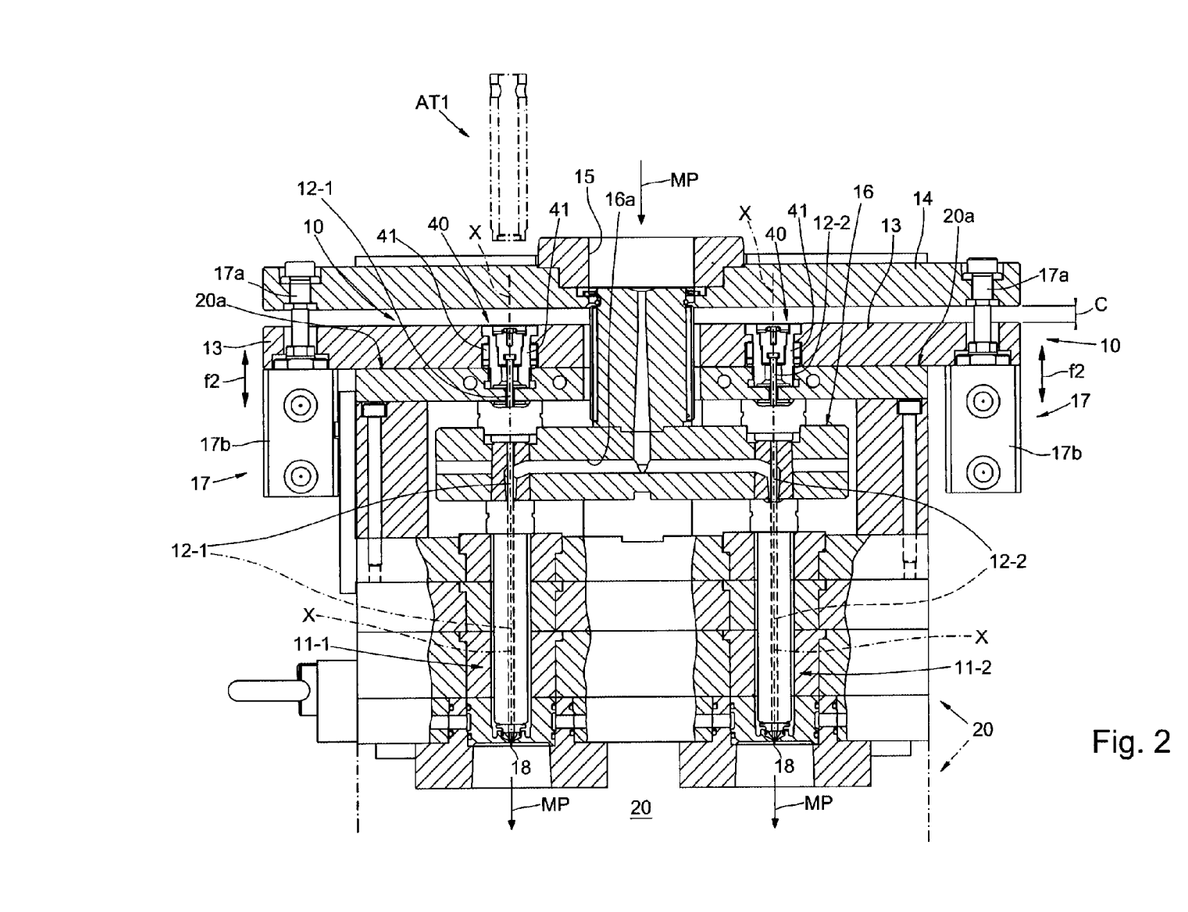
FIG. 2 is a partial view, in section, according to the plan defined by line II-II of FIG. 1, of the closure assembly, with multi-rod drive, conforming to the present invention.

As example, FIGS. 1 and 2 show only two injection units, indicated respectively with 11-1 and 11-2, of this injection moulding machine MS, but it is clear that the number of injection units can be different and substantially higher than two, depending on the specific characteristics of the mould 20, i.e. of the number of the injection points or zones that are defined along the side 20a for the injection of the plastic material into the mould 20.

In the moulding machine MS, the plastic material MP, schematized with an arrow, is fed by appropriate feeding means, not represented in the drawings, and enters through a feed opening 15 into a hot distribution plate 16, which, in turn, by means of a plurality of hot distribution channels or hot runners 16a, formed inside it, distributes the plastic material MP to the injection units 11-1 and 11-2, where it is definitively injected into the mould 20 so as to form the moulded piece.

Both the hot distribution plate 16, and the injection units 11-1 and 11-2 exhibit known features, whereby they are only briefly described and represented schematically in the drawings.

In detail, the closure assembly 10 comprises:

a plurality of closing pins or rods, indicated with 12-1 and 12-2, each extending along a respective axis X, wherein each closing rod 12-1 and 12-2 is associated with a corresponding nozzle or injection unit, respectively, 11-1 and 11-2, also extending and elongated along the X axis, and is capable of controlling with a respective tip portion or tip end the flow of the plastic material MP, in the molten state, from the corresponding injection unit 11-1 or 11-2 to the mould 20;

a movable driving plate 13, also simply called driving plate, common to all the closing rods and associated with one head end 12a, of each closing rod 12-1 and 12-2, opposite to the respective tip end used to control the flow of plastic material MP from the injection unit 11-1 and 11-2 into the mould 20, and a bottom plate 14, which is also common to all the closing rods.

The movable driving plate 13 is interposed between the side 20a, of the mould 20, which exhibits the injection points and houses the corresponding injection nozzles 11-1 and 11-2 for the injection of plastic material MP into the mould 20, and the bottom plate 14, and is also adapted to translate, along a stroke C, in response to the action of suitable command means, between an open position, indicated with P1, adjacent to the base plate 14, and a closed position, indicated with P2, adjacent to the side 20a of the mould 20.

Therefore, by this movement of translation between the open and closed positions P1 and P2, the driving plate 13 is capable of simultaneously controlling and driving the plurality of closing rods 12-1 and 12-2 between a corresponding open or retracted position, indicated with P1', in which each closing rod 12-1 and 12-2 opens, through its tip, an injection hole 18 of the respective injection nozzle 11-1 and 11-2, and a corresponding closed or advanced position, as indicated with P2', in which each closing rod 12-1 and 12-2 closes, through its tip end, the injection hole 18.

The moving or command means, adapted to command the reciprocating motion of the driving plate 13 between the positions P1 and P2, are for example made of two pistons 17, of the pneumatic or hydraulic type, arranged at opposite ends of the same driving plate 13, wherein each piston 17 has a stem 17a that is connected at its tip to the bottom plate 14, and a body 17b that is rigidly fixed on the movable driving plate 13.

Thus, each piston 17, when it is activated to command the translation movement of the driving plate 13, moves with the respective body 17b jointly with the driving plate 13.

Of course, other embodiments of the movement equipment capable of moving the driving plate 13 between the open and closed positions P1 and P2 are possible.

According to an essential feature of the present invention, each closing rod 12-1 and 12-2 of the closure assembly 10 is associated with a disconnecting and fixing device or generally with disconnecting and fixing means, indicated in the whole with 40, that are adapted to disconnect individually each closing rod 12-1 and 12-2, each independently of other, from the common driving plate 13, and to fix it permanently, once disconnected and removed, to the structure of the mould 20, along the respective side 20a.

In particular, this disconnecting and fixing device 40, also referred to hereinafter simply as disconnecting device, consists of an intermediate disconnecting element, indicated with 41 and also called simply disconnecting element, which is received in a corresponding through hole 13a, formed across the thickness of the driving plate 13, and is interposed between this hole 13a and the head end 12a of each closing rod 12-1 or 12-2.

Figures 3A, 3B, 4A:
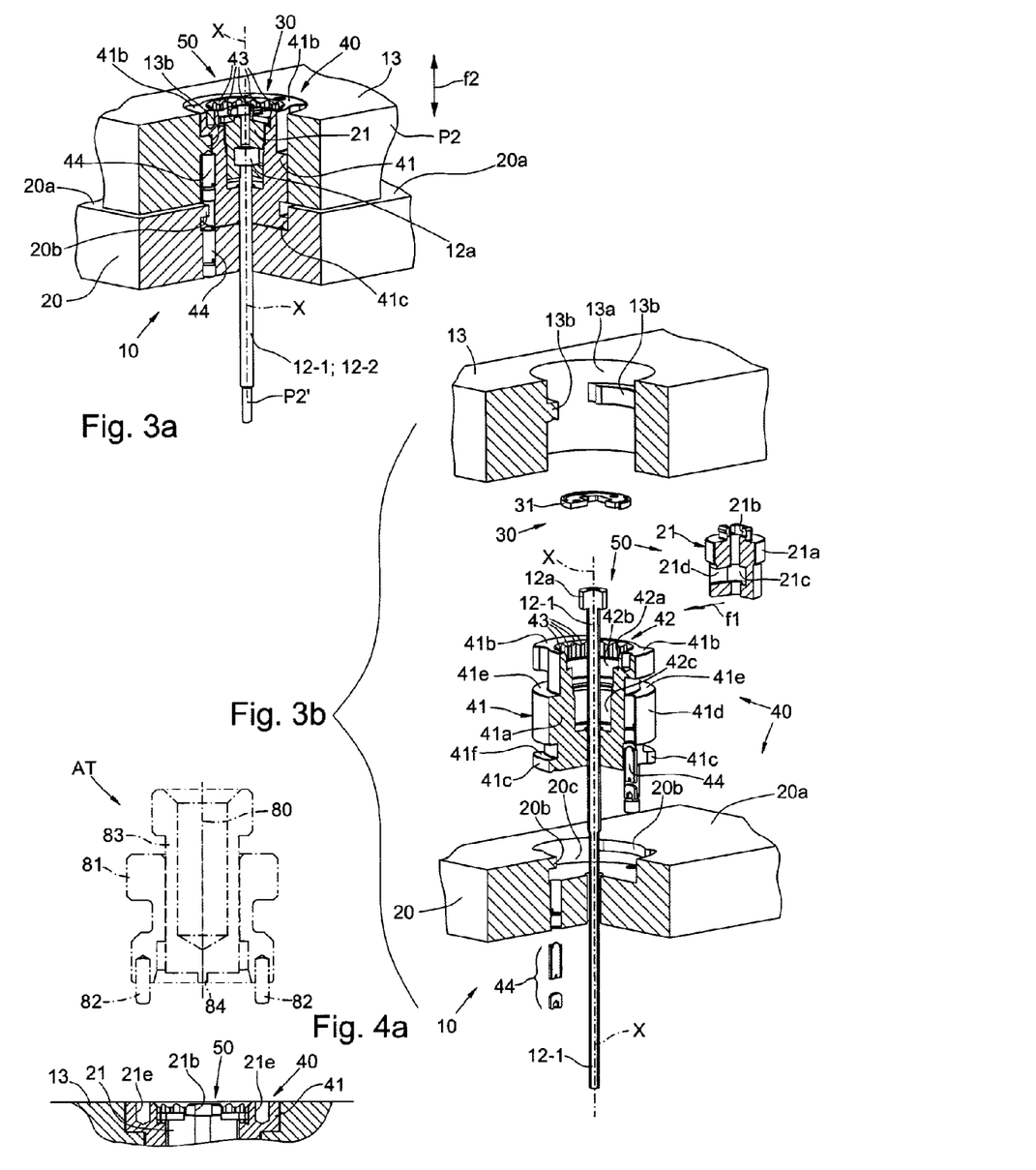
FIGS. 3a and 3b are perspective views, in assembled and exploded form and with some parts in section, of a zone, limited to a single closing rod, of the closure assembly of the invention, with multi-rod drive, of FIG. 1.
FIG. 4a is a schematic view of a tool that is used for adjusting the single closing rod of FIG. 4.
Figure 4:
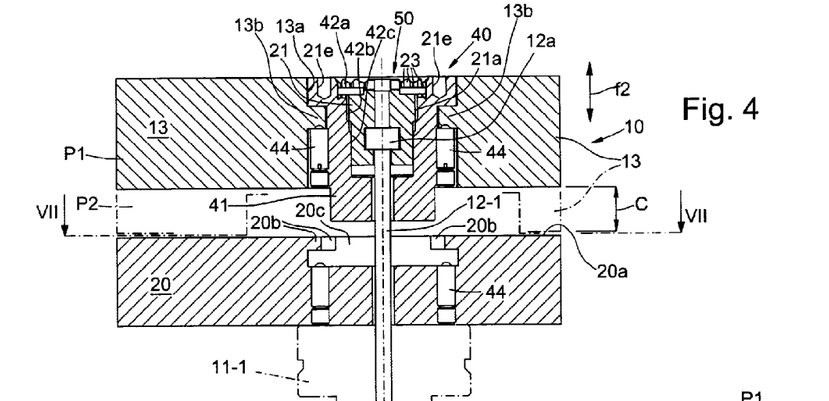
FIG. 4 is view, in side section and in increased scale, of a part, limited to a single closing rod, of the closure assembly of the invention, with multi-rod drive, of FIG. 1, in a first open operating configuration.

In detail, with particular reference to FIGS. 3a and 3b, the disconnecting element 41 includes a main body 41a, coaxial with the axis X of each closing rod 12-1 and 12-2, which has a pair of upper lobes 41b and a pair of lower lobes 41c, wherein the lobes of each pair protrude radially from the outer surface of the main body 41a and are arranged symmetrically and at opposite sides with respect to the axis X, and wherein the pair of upper lobes 41b and the pair of lower lobes 41c are mutually offset by 90° around the X axis, i.e. when viewed in plan.

The two upper lobes 41b of the disconnecting element 41 define in combination with a cylindrical central portion 41d, of the main body 41a, having an outer diameter equal to that of the lobes 41b, a seat, shaped like a circular groove, indicated with 41e, wherein these two lobes 41b and the respective seat 41e are adapted to cooperate with two corresponding projections 13b, opposite to each other, which protrude radially from the inner surface of the through hole 13a that is formed across the driving plate 13 and is adapted to receive the disconnecting element 41.

The two lower lobes 41c, of the disconnecting element 41, in turn define together with the cylindrical portion 41d, of the main body 41a, a seat, also shaped like a circular groove and indicated with 41f, wherein the two lower lobes 41c and the respective seat 41f are suitable for cooperating with two corresponding projections 20b, opposite to each other, which protrude from the inner surface of a seat 20c that is formed in the mould 20, along the respective surface 20a, and is adapted to receive the disconnecting element 41.

Unlike the pair of upper lobes 41b and the pair of lower lobes 41c, exhibited by the disconnecting element 41 and arranged, as before said, at an angle of 90° offset to each other when viewed from above, the pair of projections 13b, formed in the hole 13a, and the pair of projections 20b, formed in the seat 20c defined along the side 20a of the mould 20, are aligned each other when viewed from above.

Furthermore, a plurality of grains or spring pins 44 are provided to cooperate with the disconnecting element 41, in order to keep it stably in the position that has been set, both when the disconnecting element 41 is connected to the driving plate 13 and then moves jointly with it, and when is fixed on the mould 20 and then remains stationary, as later clearly described.

Therefore, these spring or elastic pins 44 avoid that, in the use of the moulding machine MS, because of vibrations or other factors, the disconnecting element 41 can move, by rotating around the axis X, from the position that has been set, and thereby cause an incorrect operation of the moulding machine MS.

Each closing rod 12-1 and 12-2 of the closure assembly 10, other than being associated with the disconnecting and fixing device 40, described above, is also associated with a respective micrometric regulation and adjusting device, indicated with 50, suitable for individually regulating and adjusting in a micrometric way the closing rod 12-1 and 12-2, i.e. independently of one another, in the respective closed position P2.

The micrometric adjustment device 50 associated with each closing rod 12-1 and 12-2 is essentially conforming to that described in a previous international PCT patent application, on behalf of the same Applicant, published with number WO2011/067800 A1.

For reasons of brevity, this adjustment device 50, associated with each closing rod 12-1, 12-2, will be described only in essential terms, by making reference to the above patent application for each additional and more specific information regarding details, features, use and benefits, here not explicitly described, regarding it.

Therefore, the relevant parts of this previous patent application concerning the adjustment device 50 must be considered incorporated into the present patent application, and, consistently, the present patent application will maintain, as far as possible, the same numerical references, referring to this device, as adopted in this previous patent application.

In detail, the adjustment device 50, associated with each closing rod 12-1 and 12-2, includes a control or adjustment element or pawl 21, having a substantially cylindrical shape, which extends coaxially to the axis X of the respective closing rod 12-1 and 12-2.

This adjustment element 21 is housed in the intermediate disconnecting element 41, in turn part of the disconnecting and fixing device 40, before described, and exhibits along the outer cylindrical surface a screw thread 21a, having a fine or micrometric pitch, so as to be adapted to be screwed into a corresponding seat 42, threaded, which is formed within the same intermediate disconnecting element 41.

The adjustment element 21 has also, in a lower area, a seat 21c, exhibiting an undercut shape adapted to house the end or head of each closing rod 12-1 and 12-2.

For this purpose, this undercut seat 21c defines a side opening 21d adapted to permit the side insertion of the head of each closing rod 12-1 and 12-2, during assembling of the closure assembly, as illustrated by an arrow f1 in FIG. 3b.

Therefore, by screwing or unscrewing the adjustment element 21 into the threaded seat 42, formed in the intermediate disconnecting element 41, it is possible to vary in a micrometric way along the axis X the relative position of the head 12a of the closing rod 12-1 12-2 with respect to the disconnecting element 41 and consequently to axially adjust the closing rod 12-1 and 12-2 in the respective closed position P2'.

Suitably the adjustment element 21 has, at one end, a notch 21b for applying a suitable tool, later described, to be used to rotate, or screwing or unscrewing the adjustment element 21, while adjusting the closing rod 12-1 and 12-2 in the closed position P2'.

In detail, the internal seat 42, threaded, which is defined by the disconnecting element 41 and in which the adjustment element 21 is housed, includes:

a first upper portion 42a, substantially cylindrical, which is formed adjacent to the upper side, opposite to the tip of closing rod 12-1 or 12-2, of the disconnecting element 41, and is provided along its inner cylindrical surface with a plurality of projections and depressions 43;

a second threaded portion 42b, intermediate, in which the adjustment element 21 is screwed or unscrewed in order to adjust the closing rod 12-1 and 12-2 in the closed position P2', and a third lower portion 42c which houses the lower part, of the adjustment element 21, which exhibits the undercut seat 21 for the head 12a of the closing rod 12-1 and 12-2.

In addition, there are provided fastening means, associated with the micrometric adjusting means 50 and indicated with 30, which serve to firmly fix the adjustment element 21 to the disconnecting element 41, once the closing rod 12-1 or 12-2 has been exactly adjusted in the closed position P2'.

In particular, the fastening means 30 include an elastic fixing washer 31 that is coupled jointly in the rotation with the adjustment element 21 and exhibits externally suitable protrusions, in turn designed to cooperate elastically with projections and notches 23 that are formed in the upper portion 42*a* of the internal seat 42 formed inside the disconnecting element 41.

Again, further details of the elastic washer 31 can be found in the patent application, mentioned above, on behalf of the Applicant.

For completeness, it also described a tool AT, schematically represented with dash-dot line in FIG. 4*a*, which is used to adjust the closing rod 12-1 or 12-2 in the closed position P2'.

The tool AT consists of two elements, adapted to rotate relatively to one another around a common axis 80, of which a first outer element 81, tubular, is associated with two plugs 82, that are arranged on a frontal surface of the tool AT and adapted to be inserted into corresponding holes 21*e* of the disconnecting element 41 of the disconnecting device 40, and a second inner element 83 is provided with a tab 84, in turn, adapted to engage with the notch 21*b* of the adjustment element 21.

In the use, the tool AT is coupled with the disconnecting device 40 and the adjustment device 50 by inserting the pins 82 into the holes 21*e* of the disconnecting element 41, so as to block the latter on the external element 81 of the tool AT, while at the same time the tab 84, of the internal element 83, engages with the notch 21*b* of the adjustment element 21.

Then, with the disconnecting element 41 being blocked by the external element 81, the inner element 83 is rotated relative to the outer element 81 in order to tighten or loosen the adjustment element 21 with respect to the disconnecting element 41 and thereby axially adjust the closing rod 12-1 or 12-2 in the respective closed position P2'.

It will now be described in detail the operation of the closure assembly 10.

In a preliminary stage, the closure assembly 10 is arranged in such way that all their rods 12-1 and 12-2 are connected at the respective ends 12*a* jointly to the driving plate 13, so that they can be driven in response to the movement of the latter.

Figure 6:
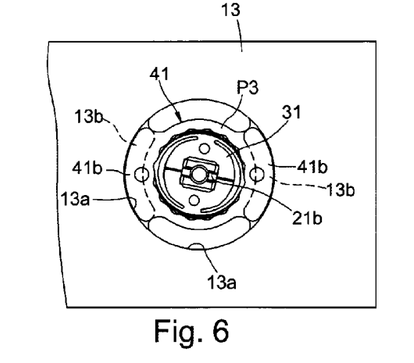
FIG. 6 is a top view of the closure assembly of FIGS. 4 and 5, limited to a single closing rod, in the open and closed operating configuration.
Figure 7:
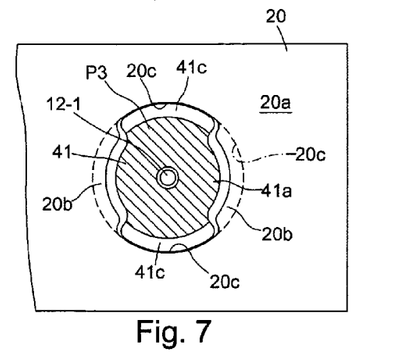
FIG. 7 is a top view and in cross-section, along the line VII-VII, of the closure assembly of FIGS. 4 and 5, limited to a single closing rod, in the open and closed operating configuration.

To this purpose, the disconnecting element 41, associated with each closing rod 12-1 and 12-2, is placed in a first connecting position, indicated with P3 in FIGS. 6 and 7, in which the upper lobes 41*b* and the seat 41*e* engage with the projections 13*b* formed in the hole 13*a* of the driving plate 13, and the lower lobes 41*c* and the seat 41*f* are disengaged from the protruding ribs 20*b* of the seat 20*c* formed along the side 20*a* side of the mould 20.

Therefore, with the disconnecting element 41 placed in the position P3, each closing rod 12-1 and 12-2 is jointly connected to the driving plate 13, so that it can be controlled and driven by it, and at the same time is free to translate axially, together with the driving plate 13, when it is moved between the positions P1 and P2.

Still, at this preliminary and early preparation stage of the closure assembly 10, the closing rods 12-1 and 12-2 are suitably adjusted in the respective closed position P2', by operating on the adjustment element 21, i.e. by screwing or unscrewing it, in the seat 42 defined inside the disconnection element 41, through the spring washer 31, which in turn acts, by cooperating elastically with the projections and depressions 43 formed in the same seat 42, to set firmly in the axial direction the adjustment element 21, once it has reached the position corresponding to the desired closed position P2' of the closing rod 12-1 or 12-2.

The adjustment phase, of each closing rod 12-1 and 12-2, that is directed to adjust exactly it in the respective closed position P2', has been described only briefly.

In fact, this adjustment phase is performed in the preliminary preparation stage of the closure assembly 10, and is therefore distinct from the next injection step of the plastic material into the mould 20, during which injection step the closure assembly 10, object of the present invention, operates and is actually used to control the injection unit.

In any case, for a more detailed description of the operation of this micrometric adjustment device 50, reference is made to the international patent application, before mentioned, on behalf of the Applicant.

At this point, the moulding machine MS and the respective closure assembly 10, with all the closing rods 12-1 and 12-2 connected to the driving plate 13, are ready for use, i.e. to activate and start the effective phase of injecting the plastic material MP into the mould 20.

Therefore, the pistons 17 are activated so as to drive the reciprocating motion of the driving plate 13 between the bottom plate 14 and the side 20*a* of the mould 20, i.e. between the open and closed position P1 and P2 of the driving plate 13, whereby all the closing rods 12-1 and 12-2 move simultaneously between the respective open positions P1' and closed positions P2', as indicated by a double arrow f2 in the drawings, together with the driving plate 13, in order to control the injection, through the corresponding injection units 11-1 and 11-2, of the plastic material MP into the mould 20.

During operation of the moulding machine MS it may happen that, for whatever reason, one of the injection unit 11-1 or 11-2, 11-1 for example, is subject to a failure, thus requiring an intervention aimed at eliminating the defect or at least reducing the impact of it on the operation of the moulding machine MS.

In these or similar circumstances, thanks to the closure assembly 10 of the present invention, advantageously it is possible to exclude the failed injection unit 11-1, and to continue to use the other injection units, namely the unit 11-2, to inject the plastic material MP into the mould 20.

Figure 5:
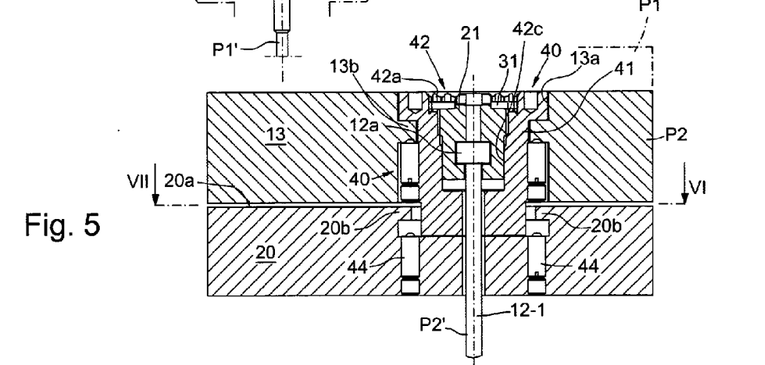
FIG. 5 is a view, in side section and in increased scale, of the closure assembly of FIG. 4, limited to a single closing rod, in a second closed operating configuration.
Figure 10:
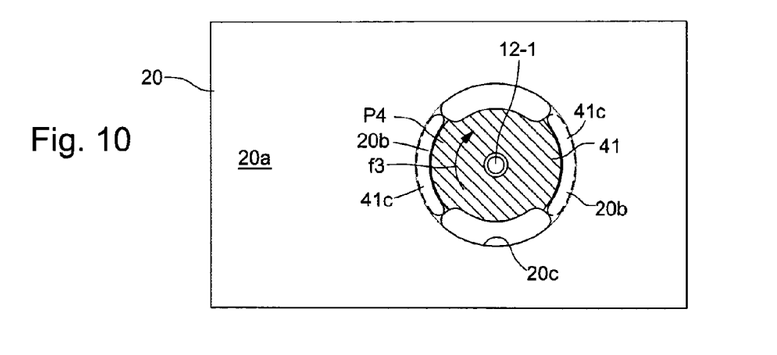
FIG. 10 is a top view and in cross-section, along the line X-X, of the closure assembly of FIG. 7, limited to a single closing rod, in the disconnected configuration.

In particular, once the moulding machine MS is stopped and with the driving plate 13 arranged the closed position P2, as shown in FIG. 5, the operator disconnects from the driving plate 13 the closing rod 12-1 of the defective injection unit 11-1, by turning of 90° the corresponding disconnecting element 41, from the position P3 to the position P4, as indicated by an arrow f3 in FIG. 10.

In this way, the upper lobes 41*b*, of the disconnecting element 41, disengage from the projections 13*b*, formed in the through hole 13*a*, so as to assume a relative angular position, with respect to such projections 13*b*, in which the closing rods 12-2 is disconnected from the driving plate 13, so as to leave it free to translate between the positions P1 and P2.

At the same time, the lower lobes 41*c* engage with the projections 20*b* of the seat 20*c* formed along the side 20*a* of the mould 20, so as to permanently fix the closing rods 12-1, once disconnected from the driving plate 13, to the mould 20.

For example, this operation of disconnecting and fixing the closing rod 12-1 can be performed by using a special tool AT1, having a tubular shape and schematically shown in FIG. 2, which is provided for being coupled with the disconnecting element 41.

Figure 8:
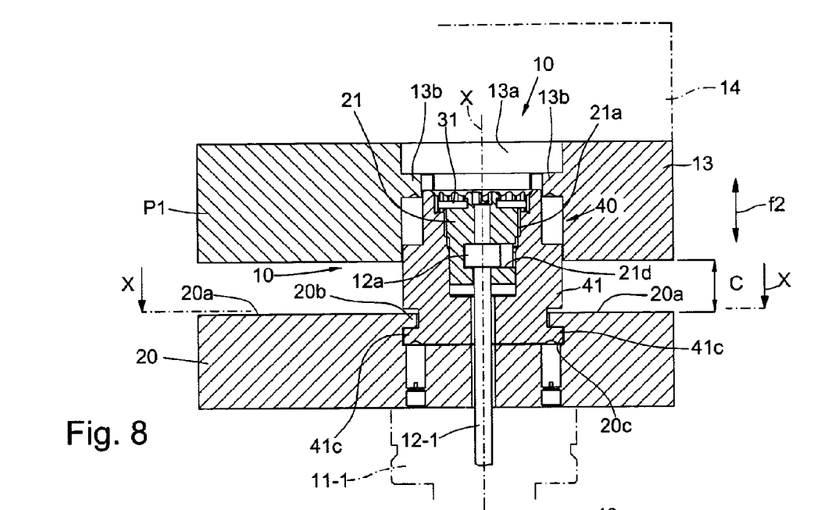
FIG. 8 is a view, in side section and in a larger scale, of the closure assembly of FIGS. 4 and 5, restricted to a single closing rod, in a further configuration, not operational, where the closing rod is disconnected from a driving plate of the closure assembly.
Figure 9:
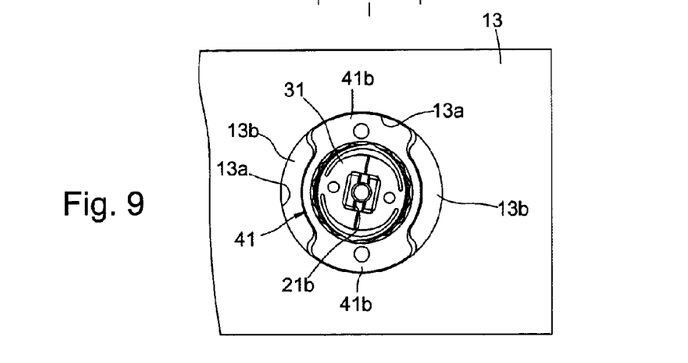
FIG. 9 is a top view of the closure assembly of FIG. 7, limited to a single closing rod, in the respective disconnected configuration.

Therefore, at the next start of moulding machine MS, the driving plate 13 can move freely, as indicated by double arrow f2 in FIG. 8, with respect to the disconnecting element 41, which remains firm and bound to the mould 20, together with the closing rod 12-1 of the defective injection unit 11-1.

Therefore, in this way, after having disabled the injection unit 11-1, defective, and thereby disconnected the respective closing rod 12-1 from the driving plate 13, it is possible to continue to use the closure assembly 10 in order to drive contemporarily, through the same driving plate 13, the other closing rods, i.e. the other closing rod 12-2, whose end 12a remains connected to the driving plate 13, between the respective open position P1 and closed position P2.

It is so clear from the above description that the present invention fully achieves the objects to which it was intended, and in particular provides a closure assembly that, when an injection unit of the moulding machine fails, allows the user to continue to use the other injection units in order to inject the plastic material into the mould, without having to wait to have to repair the faulty injection unit and thereby avoiding to loose time because of this repair, as instead it happens today in the known technique.

Of course, without prejudice to the principle and basic concepts of the present invention, the forms of implementation and details of construction of the closure assembly, here proposed, can be widely varied with respect to what has been described and illustrated, without departing from the scope of the same invention.

For example, according to a variant not represented in the drawings, the adjustment means 50, for adjusting each closing rod in the closed position P2, may be entirely absent.

Therefore in this variant the head end 12a of each closing rod 12-1 and 12-2, instead of being housed in an adjusting element, in turn axially adjustable with respect to the disconnecting element 41 associated with the driving plate 13, will be housed directly within the disconnecting element 41, without the interposition of any adjusting element.

The invention claimed is:

1. A closure assembly of the type with a multi-rod drive for a machine or system for an injection moulding of a plastic material comprising:
   a plurality of closing rods each associated with a respective nozzle or injection unit for the an injection of the plastic material into a mould;
   a driving plate common to said plurality of closing rods and associated with an end of each closing rod of said plurality of closing rods, said driving plate being capable of moving between an open position and a closed position in order to contemporarily drive said plurality of closing rods between a corresponding open position, in which each closing rod opens an injection hole of the respective injection unit, and a corresponding closed position, in which the closing rod closes said injection hole of the respective injection unit; and
   disconnecting and fixing means that are associated with each closing rod of the plurality of closing rods for disconnecting a respective end of each closing rod of the plurality of closing rods from said driving plate, independently from the other closing rods, and for firmly fixing said end of each closing rod, once disconnected, to a fixed part of said mould,
   whereby, when a closing rod of said closure assembly is disconnected from said driving plate and fixed to said mould through said disconnecting and fixing means, the other closing rods of said closure assembly that remain connected to the driving plate can continue to be used and driven in order to inject, by the respective injection units, the plastic material into the mould,
   wherein said disconnecting and fixing means comprise a disconnecting element that is associated with said driving plate and houses said end of the closing rod, and
   wherein said disconnecting element, by rotating about an axis of a respective closing rod, is capable of moving, with respect to the driving plate, between a first operative position, in which the disconnecting element is connected to the driving plate and is disconnected from the mould, whereby the closing rod is free from the mould and is adapted to be driven by the driving plate when moving between the respective open and closed position, and a second operative position, in which the disconnecting element is disconnected from the driving plate and is connected to the mould, whereby the closing rod remains firmly fixed to the mould and is not adapted to be driven by the driving plate when moving between the respective open and closed position.

2. The closure assembly according to claim 1, wherein said disconnecting element comprises a main body which is externally provided of one or more lobes or projections adapted to cooperate with corresponding projections defined by a first seat formed in said driving plate, and by a second seat, formed in said mould,
   wherein, when said disconnecting element is in said first operative position, said one or more lobes are engaged with projections of said first seat and are disengaged from the projections of said second seat, so as to connect the closing rod with said driving plate and to allow the closing rod, when driven by the driving plate, to freely translate axially with respect to said mould, and
   wherein, when said disconnecting element is in said second operative position, said one or more lobes are disconnected from the projections of said first seat and are engaged instead with the projections of said second seat, so as to firmly fix the closing rod to the mould, and at the same time to allow the driving plate to freely translate along its stroke for moving and driving the other closing rods, connected to the driving plate.

3. The closure assembly according to claim 2, wherein said disconnecting element exhibits a first pair of upper lobes, formed by two opposite lobes, and a second pair of lower lobes, also formed by two opposite lobes, provided for cooperating respectively with the projections defined by said first seat, formed in the driving plate, and the projections defined by said second seat, formed in said mould, wherein said first pair of upper lobes and said second pair of lower lobes are reciprocally offset of 90° about the axis of said disconnecting element.

4. The closure assembly according to claim 1, wherein regulation and adjustment means are associated with each closing rod of the plurality of closing rods for adjusting and regulating the closing rod, in the closed position, independently from the other closing rods.

5. The closure assembly according to claim 4, wherein said regulation and adjustment means are adapted to adjust axially each closing rod of the plurality of closing rods in the closed position, and comprise an adjustment element, in which the end of the closing rod is housed, that is provided with a thread having a fine pitch and is capable of being screwed or unscrewed in a corresponding threaded internal seat formed in said disconnecting element 414, in order to vary the position of the closing rod, along its axis, with respect to said driving plate and thereby regulate axially the closing rod in the closed position, and
   wherein fixing means are provided, associated with said regulations and adjustments means for stably fixing said adjustment element to said disconnecting element once said closing rod has been regulated in the closed position.

6. The closure assembly according to claim 1, further comprising command means capable of commanding a reciprocating motion of said driving plate between the open position and the closed position, wherein said command means include at least one command pneumatic or hydraulic piston.

7. The closure assembly according to claim 1, comprising only two closing rods and thereby only two corresponding injection units to inject the plastic material into the mould.

8. A moulding machine for the injection moulding of plastic material, comprising the closure assembly according to claim 1.

* * * * *